March 17, 1970 R. T. GOULD 3,500,535
METHOD OF ASSEMBLING AN ELECTRICAL MEASURING INSTRUMENT
Filed Oct. 17, 1966 2 Sheets-Sheet 2
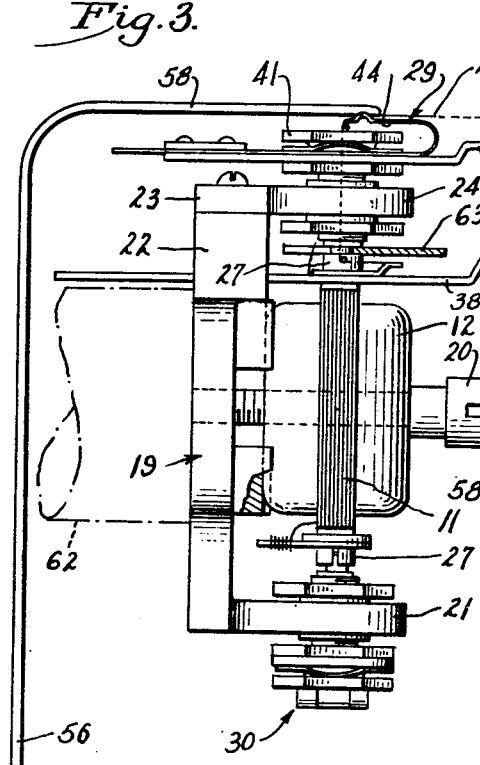
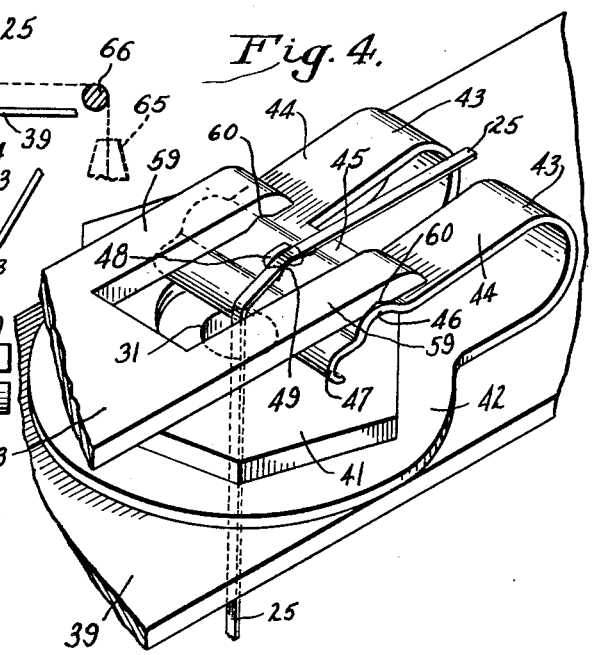
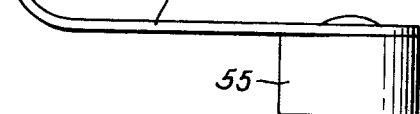
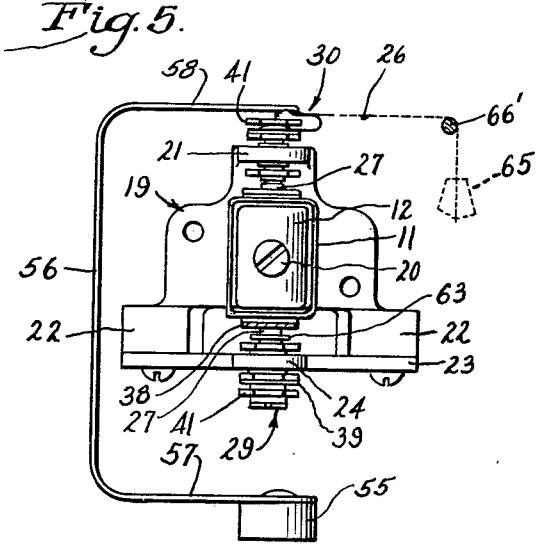
INVENTOR.
Raymond T. Gould
BY
Wolfe, Hubbard, Voit & Osann
ATTORNEYS

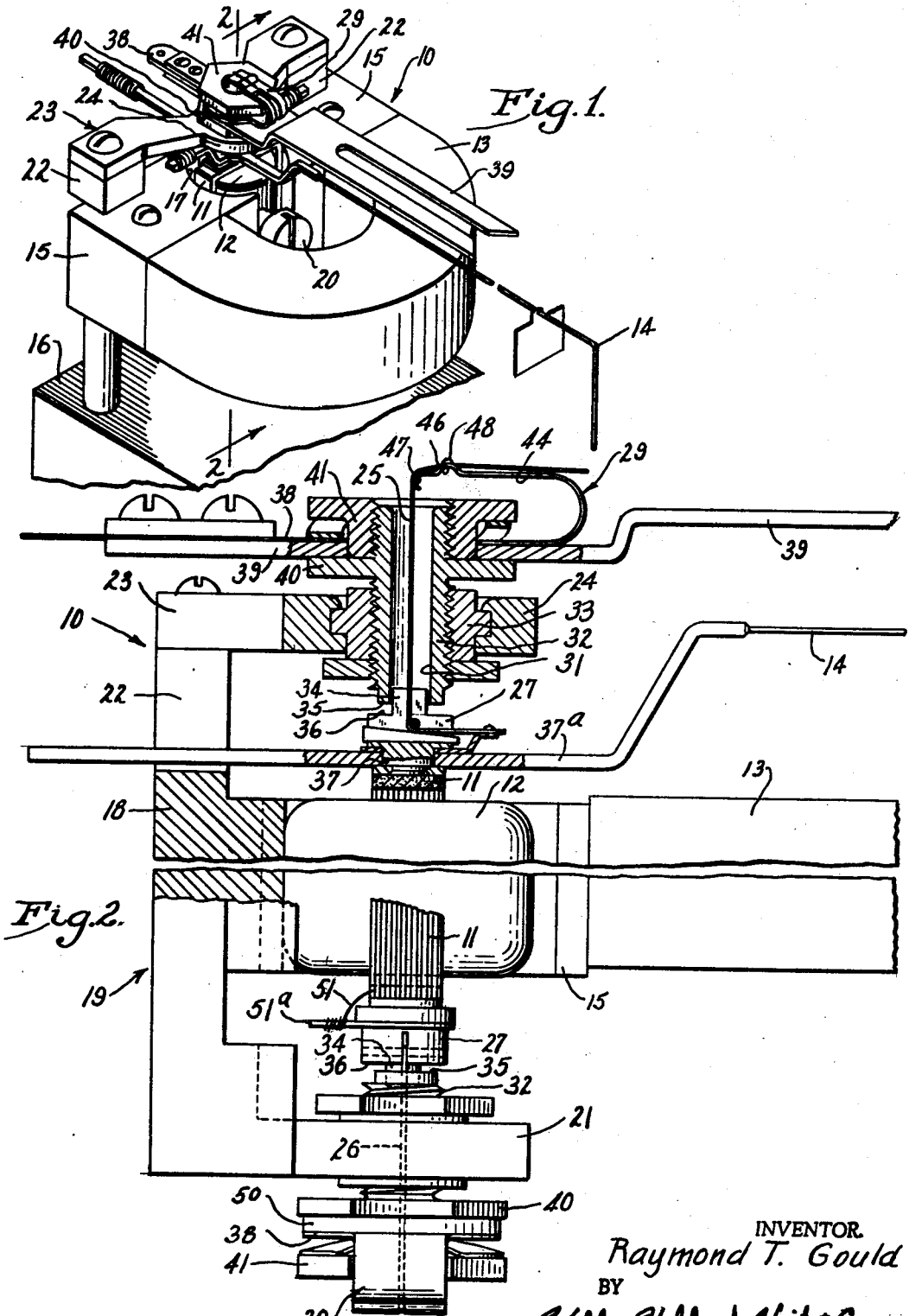

United States Patent Office 3,500,535
Patented Mar. 17, 1970

3,500,535
METHOD OF ASSEMBLING AN ELECTRICAL MEASURING INSTRUMENT
Raymond T. Gould, Harlem Township, Winnebago County, Ill., assignor to Barber-Colman Company, Rockford, Ill., a corporation of Illinois
Filed Oct. 17, 1966, Ser. No. 587,051
Int. Cl. B23p *19/04*
U.S. Cl. 29—606
10 Claims

ABSTRACT OF THE DISCLOSURE

This disclosure relates to methods of assembling an electrical measuring instrument of the type in which a movable coil assembly is suspended for free rotation between the core and poles of a permanent magnet by a pair of thin elongated filaments fastened to and tensioned between a pair of cantilever springs wherein each spring is deflected with a predetermined force to an unselected position so that the force exerted on the filaments by each spring is approximately equal even though the springs have different characteristics.

---

This invention relates to an electrical measuring instrument of the precision type in which a movable coil assembly is suspended for free rotation between the core and the poles of a permanent magnet by a pair of thin elongated filaments or bands fastened to and tensioned between a pair of resilenently yieldable supports such as small cantilever springs. In the assembly of such an instrument, it is customary to deflect the springs to a preselected position with an external force, and then to solder or otherwise fasten the free end portions of the filaments to the deflected springs so that tensional forces are exerted on the filaments when the external force is removed due to the tendency of the springs to return to their relaxed positions.

The general object of the present invention is to deflect the springs by a new and improved method which insures that the movable coil assembly will be located accurately relative to and free from engagement with the core and other stationary parts of the instrument in spite of wide variations inherently occuring in the characteristics of springs used in such instruments.

A related object is to deflect the springs in a novel manner such that the tension is the filaments of all like assembled instruments is substantially uniform.

A more detailed object is to achieve the foregoing by deflecting each spring with a predetermined force and to an unselected position, as opposed to a preselected position, so that the force exerted on the filaments by each spring is approximately equal even though the springs have different characteristics.

The invention also resides in the novel construction of each spring enabling the deflecting force to be applied at an accurately determined location on the spring.

Other objects and advantages will become apparent from the following detailed description taken in connection with the accompanying drawings, in which:

FIGURE 1 is a perspective view of a novel measuring instrument assembled in accordance with the method of the invention;

FIG. 2 is an enlarged fragmentary cross-section taken substantially along the line 2—2 of FIG. 1;

FIG. 3 is a fragmentary side elevataional view of the instrument showing the upper filament positioned for soldering to the deflected upper spring;

FIG. 4 is an enlarged perspective view of the spring and filament shown in FIG. 3; and FIG. 5 is a fragmentary front elevational view of the instrument showing the lower filament positioned for soldering to the lower spring.

While the present invention will be described in some detail with reference to a particular preferred procedure, and with reference to a particular exemplary organization of a meter, there is no intention that it thus be limited to such detail. On the contrary, it is intended here to cover all modifications, alternatives, and equivalents falling within the spirit and scope of the invention as defined by the appended claims.

Referring specifically to FIGS. 1 and 2, there is shown a typical "taut band" electrical measuring instrument in the form of a new and improved galvanometer movement 10 assembled in accordance with the principles of the present invention. Since many of the elements of the movement itself are of more or less conventional construction, and form the background environment for the invention, they will be described here only in sufficient detail to enable a complete understanding of the novel aspects of the invention. In general, the movement comprises a rectangular coil 11 wound of fine wire and surrounding a stationary cylindrical core 12 of magnetic material. The coil is suspended for free rotation relative to the core between the poles of a permanent magnet 13. Movable with the coil is a pointer 14 for indicating on a scale (not shown) the strength and direction of a minute electric current flowing through the coil. The current flowing through the coil creates an electromagnetic field which interacts with the flux between the magnet poles and the core to produce rotation of the coil for moving the pointer along the scale.

More specifically, the movement 10 includes a pair of magnetic pole pieces 15 of rectangular cross section supported on a base 16 and formed with arcuate inner ends defining a centrally disposed vertical opening 17 (FIG. 1). The legs of the horseshoe magnet 13 are fastened to the sides of the pole pieces, and thus the inner ends of the pole pieces constitute pole faces on opposite sides of the opening 17. Disposed within the opening and spaced slightly from the pole faces are the movable coil 11 and the stationary core 12, the latter being secured near the mid-point of a vertical wall 18 of a non-magnetic supporting case 19 (FIGS. 2 and 3) by a screw 20. The supporting cage is bolted to the sides of the pole pieces opposite the magnet and is formed with a lower horizontal leg 21 underlying the core and a pair of horizontally spaced lugs 22 projecting upwardly from the top edge of the vertical wall. Spanning the lugs is a nonmagnetic removable bridge 13 formed with a horizontal leg 24 (FIG. 2) extending over the core.

As shown most clearly in FIG. 2, the coil 11 surrounds the core 12 and is suspended for rotation relative thereto by a pair of thin elongated filaments 25 and 26 extending from opposite ends of the coil. More specifically, the filaments are thin, resilient rectangular metal bands (approximately .0045 × .00044 of an inch in cross-section) which are fastened at their inner ends in any suitable manner to caps 27 bonded securely to the upper and lower end surfaces of the coil. Near their free ends, the bands 25 and 26 are respectively soldered, bonded or otherwise fixed to upper and lower resiliently yieldable supports in the form of beryllium-copper leaf springs 29 and 30. Only the upper spring and band mounting will be described in detail since the lower construction is identical for differences to be discussed below.

Herein, the upper band 25 projects upwardly from the cap 27 through a vertical bore 31 formed in a tubular caging screw 32 threaded into a stationary bushing 33 extending through the leg 24 of the bridge 23. At its upper end, the cap 27 is formed with a cylindrical extension 34 of reduced diameter received within the bore 31 of the caging screw but spaced from the walls of the bore so that the cap, and thus the coil, may rotate without frictional engagement with the screw. Axial movement of the coil relative to the screw is limited by opposed abutments formed by the lower end 35 of the screw and an upwardly facing shoulder 36 located at the junction of the cylindrical extension 34 with the main body of the cap. Preferably, the shoulder 36 is normally spaced approximately .015 of an inch below the end of the screw so as not to interfere with the rotation of the coil. An oppositely extending cylindrical extension 37 of the cap projects through and is fastened to an arm 37a connected to the pointer 14 thus mounting the pointer for rotation with the coil.

The supporting spring 29 is generally U-shaped as viewed in FIG. 2 and comprises a relatively long lower leg 38 fastened near one end by a pair of screws to a zero-adjuster arm 39 which rests on an annular flange 40 formed integrally with the caging screw 32. As is conventional, the arm and the attached spring are rotatable about the shank of a collar nut 41 to adjust the null position of the coil 11, the nut extending through the arm and the spring and being threaded over the upper end of the caging screw. Adjacent the collar, the lower leg of the spring is formed with an enlarged circular portion 42 (FIG. 4) which merges into a pair of separated strips folded upwardly and reversely at 43 to present a pair of upper legs 44 disposed cantilever fashion above the collar and interconnected by an integral bridge 45. For a novel purpose which will become more apparent below, the bridge 45 is formed with a raised rib 46 located just beyond the legs 44 and with a downwardly turned lip 47 disposed adjacent the axis of the bore 31 in the caging screw 32. As shown most clearly in FIG. 4, the upper end portion of the suspension band 25 bends around and bears against the curved lip 47 and herein is soldered at 48 to the rib 46. In order to locate the band accurately relative to the spring for soldering purposes, the rib is formed with a groove 49 (FIG. 4) which receives the band, the widest surface of the band resting against the bottom of the groove.

Except for the absence of the adjustment arm 39 and the pointer 14, the lower spring 30 and its associated mounting structure are substantially identical to the upper construction described above. The lower caging screw 32 is threaded into the lower leg 21 of the supporting cage 19 and the long leg 38 of the lower spring 30, instead of being fastened to an adjustment arm, is simply bolted to a flat plate 50 (FIG. 2). As is conventional in a meter movement of this type, the lower spring 30 is displaced relative to the upper spring through a ninety degree angle about the axis of the coil 11, and thus the widest surfaces of the bands 25 and 26 are disposed at right angles to each other.

In addition to supporting the coil 11, the springs 29 and 30 and the bands 25 and 26 form part of the circuit for conducting the current to be measured to the coil. For this purpose, the free ends of the long legs 38 of each spring are electrically connected to the terminals of the galvanometer, and strands 51 (FIG. 2) of wire unwound from the ends of the coil are soldered to terminals 51a fastened to the caps 27 (only the lower strand and its terminal being shown). Current thus may flow into and out of the coil through the springs and the bands.

In the assembly of a galvanometer movement 10 such as described above, it is customary to deflect the short legs 44 of the springs 29 and 30 toward the coil 11 before the bands 25 and 26 are soldered in place. Thus, the bands remain permanently under tension after being soldered because of the tendency of the deflected springs to return to their relaxed positions. The electromagnetic field created by the flow of current through the coil interacts with the magnetic flux crossing the air gaps between the pole faces and the core 12 producing a torque which is substantially proportional to the magnitude of current flow and which tends to rotate the coil from its normal zero position. Such torque twists the taut bands about their own axes thus setting up torsional stresses in the bands tending to restore the coil to its null position.

It has been the prior practice to deflect each supporting spring 29, 30 toward the coil 11 to a preselected position before the band 25, 26 is soldered to the spring. Because the springs often vary in such characteristics as composition, thickness, heat treatment and shape, this practice often results in the exertion of more force on the bands by the upper spring than by the lower spring or vice versa. As a consequence, when the springs are released from their preselected deflected positions, the coil may not be longitudinally centered relative to the core 12 and the stationary supporting structure of the movement. Thus, the coil may engage the top or bottom of the core, or the shoulder 36 on one of the caps 27 may engage the end 35 of the adjacent caging screw 32, it being remembered that the clearance between the shoulder and the end of the screw is only about .015 of an inch. Such engagement interferes with free rotation of the coil and thereby destroys the sensitivity of the instrument. Even though the coil may not engage any stationary elements, deflection of the springs to preselected positions often causes excessive and undesirable variations in the tensions in the bands of a succession of movements assembled in this manner.

In accordance with the present invention, the springs 29 and 30 are initially deflected and stressed by a novel method which insures that the force exerted by the springs on their respective bands 25 and 26 will be approximately equal so that the coil 11 will be longitudinally centered and freely rotatable in spite of wide differences inherently occurring in the characteristics of the springs. For this purpose, each spring is deflected by a predetermined external force and to an unselected position, as opposed to a preselected position, before the bands are soldered to the springs. Thus, after the soldering operation is completed and the external force removed, the forces exerted on the bands by each spring of every meter are proportional to the applied external deflecting force and are substantially equal to each other.

In the present instance, the predetermined external force for deflecting the springs 29 and 30 is supplied by the weight of an object including a small metal block 55 (FIG. 3) and a C-shaped hanger 56. In one specific instance of practicing the invention, the block and the hanger have a combined weight of about 80 grams in order to produce about 50 grams of tension in the bands 25 and 26. The hanger includes a lower horizontal leg 57 supporting the block and an upper horizontal leg 58 having a bifurcated free end defining a pair of prongs 59 (FIG. 4) formed with downwardly opening notches 60 for embracing the ribs 46 on the springs.

To attach the bands 25 and 26 to the springs 29 and 30 in accordance with the principles of the present invention, it is convenient first to clamp the cage 19 and the associated stationary structure on a horizontal rotatable arm 62 of a convenional clamping fixture as shown most clearly in FIG. 3. The coil, with the bands 25 and 26 attached to its upper and lower caps, is then placed between the caging screws 32, and the free ends of the bands are threaded through the bores 31 in the screws.

The next step in the assembly consists of placing a temporary shim 63 (FIG. 3) of appropriate thickness (e.g. approximately .015 of an inch) between the shoulder 36 on the upper cap 27 and the lower end 35 of the upper caging screw 32. By using such a shim, the vertical position of the coil 11 may be located while the upper band 25 is being soldered to the upper spring 29. After the coil has been shimmed, the C-shaped hanger 56 is placed on the upper spring (FIG. 3) with the notches 60 in the prongs 59 fitting over raised rib 46 formed on the bridge 45 of the spring. As a result, the combined weight of the hanger and the block 55 deflects the bridge 45 and the upper legs 44 of the spring downwardly toward the coil 11. The raised rib on the spring, in conjunction with the notches in the hanger, insures that the deflecting force will be accurately located and will be applied at the same location on each individual spring so that a given deflecting force results in a proportional tensional force being applied by the spring to the band at the curved lip 47.

After the upper spring 29 has been deflected, a small weight 65 (FIG. 3) is clipped to the free end of the upper band 25, and the latter is passed over the downwardly turned lip 47 of the spring and into the groove 49. Beyond the groove, the band is turned downwardly over a stationary rod 66 of the clamping fixture with the weight 65 hanging free. The weight is just large enough to take the slack out of the upper band and to pull the coil 11 upwardly so that the shoulder 36 on the cap 27 engages the shim 63. With the coil 11, the spring 29 and the band 25 thus positioned, a small drop of solder is applied, with heat, to join the band to the rib 46. The excess length of band beyond the solder joint then is trimmed away and the hanger 56 is removed to complete the assembly of the upper portion of the movement. Upon removal of the hanger, the upper legs 44 of the spring will, of course, tend to return to their undeflected positions and will exert tensional force on the band 25 proportional to the deflecting force applied by the hanger and the block 55. Because of the force exerted by the spring, the shoulder 36 on the cap 27 will be drawn into rather tight engagement wtih the shim 63.

To attach the lower band 26 to the lower spring 30, the clamping arm 62 is rotated through 180 degrees about its axis to position the lower spring 30 above the upper spring 29 as shown in FIG. 5. The hanger 56 is then placed on the spring 30 to deflect the latter, and the band 26 is placed in the groove 49 in the rib 46 and turned downwardly over a stationary fixture arm 66'. The same small weight 65 is clipped to the free end of the band and allowed to hang downwardly to take up slack. The band 26 is then soldered to the deflected spring 30 in the same manner described above, and the excess length of band trimmed away. The assembly may now be returned to an upright position and the shim 63 removed to complete the assembly of the movement. Because the lower spring 30 is deflected with the same external force as the upper spring 29, each exerts an equal amount of force on the bands even though the springs may have been deflected to different positions because of varying characteristics. As a result, when the shim 63 is removed, the spacing between the abutments 35 and 36 remains almost exactly equal to the shim thickness. The coil 11 is thus accurately centered relative to the core 12 and the caging screws 32, and the tensions in the two bands are equal. Moreover, by employing the same or identical weighted hangers 56 in the assembly of a succession of like instrument movements, the bands in all of the movements will be equally tensioned. It is, of course, desirable that the tension in the bands be relatively high to minimize vibration amplitude and to prevent the coil from sagging excessively when the coil axis is in a horizontal plane. The tension in the bands must be limited, however, to approximately one third of the yield strength of the bands to prevent excessive stresses in the bands when the latter are twisted or when the movement sustains a shock. The present method of assembly insures that the tensions in the bands of all of the movements will be at optimum values.

It is apparent that the weight of the coil assembly, i.e., the elements suspended by the bands, acting on the upper band 25 and the upper spring 29 may cause the coil 11 to be located off-center and slightly below the desired position in spite of the accurate procedure described above. It has been found that any necessary compensation for the weight of the coil assembly may be effected satisfactorily simply by using a shim 63 of slightly less thickness than the desired clearance between the upper shoulder 36 and the end 35 of the caging screw. Thus, for example, by using a shim .012 of an inch thick in those instances where it is desired that the final gap between abutments 35, 36 be .015 of an inch, the weight of the coil assembly may deflect the upper spring an additional .003 of an inch, but the gap between the lower shoulder and the end of the lower caging screw will remain adequately wide. For even more accurate results, a smaller deflecting force may be applied to the lower spring than to the upper spring while using a shim 63 equal in thickness to the desired clearance. Thus, by deflecting the lower spring with a force equal to the upper deflecting force less the force exerted by the weight of the coil assembly, the force of the upper spring tending to move the coil upwardly will be equal to the total force exerted by the lower spring and the weight of the coil assembly tending to move the coil downwardly. Accordingly, the coil will be centered accurately even though the coil assembly applies a small deflecting force to the upper spring.

I claim as my invention:

1. In a method of suspending and accurately locating a coil assembly of an electrical measuring instrument from first and second resiliently yieldable supports spaced from opposite ends of the coil assembly, the coil assembly having first and second thin elongated suspension filaments extending from opposite ends thereof, the steps comprising, restraining the coil assembly in a predetermined spaced relation to a fixed portion of one of said yieldable supports, applying a first predetermined force to the first support to deflect the latter toward the coil assembly to a first unselected position, fastening the free end portion of the first filament without slack to the deflected first support, subsequently removing said force, applying a second predetermined force to the second support to deflect the later toward the coil assembly to a second unselected position, fastening the free end portion of the second filament without slack to the deflected second support, subsequently removing said second force, and releasing the coil assembly from said restraint, whereby each support exerts a tension force on its respective filament substantially proportional to the force applied to deflect the support.

2. The method defined in claim 1 in which the first and second predetermined forces applied to the respective supports are of equal magnitude, whereby the supports exert equal but opposite tensional forces on the filaments.

3. The method defined in claim 1 in which the predetermined force applied to one support is larger in magnitude than the predetermined force applied to the other support, whereby the tensional force exerted on one of the filaments by the one support is larger than the tensional force exerted on the other of the filaments by the other support.

4. The method as defined in claim 3 in which the predetermined force applied to the one support is approximately equal in magnitude to the sum of the magnitude of the predetermined force applied to the other support and the tensional force exerted on one of the filaments by the weight of the coil assembly.

5. In a method for accurately locating and suspending a coil assembly of an electrical measuring instrument from first and second resiliently yieldable cantilever-type springs mounted on a support and spaced from the opposite ends of the coil assembly, the coil assembly being disposed between abutments located on the support between the springs and the ends of the coil assembly and having first and second thin elongated suspension filaments extending from opposite ends thereof, the steps comprising, placing the support in a position in which the first spring is disposed above the second spring and the coil assembly, placing a shim to maintain the upper end of the coil in spaced relationship from the adjacent abutment, applying a first predetermined force equal to or greater than the force exerted by the weight of the coil assembly to the first spring to deflect the latter toward the coil assembly, drawing the first filament taut between the coil assembly and the first spring, fixing a portion of the taut first filament to the deflected first spring, removing the force from the first spring, applying a second predetermined force of a magnitude between substantially the first force and substantially the first force minus the weight of the coil assembly to the second spring to deflect the latter toward the coil assembly, drawing the second filament taut between the coil assembly and the second spring, fixing a portion of the taut second filament to the deflected second spring, and removing the second force and the shim, whereby the springs exert a predetermined tensional force on the filaments and the coil assembly remains in the approximate position in which it was shimmed in spite of variations in the characteristics of the two springs.

6. The method defined in claim 5 in which the applied forces are equal.

7. The method defined in claim 5 in which one of said applied forces is greater than the other of said applied forces to compensate for the weight of said coil assembly.

8. In a method for accurately locating and suspending a coil assembly of an electrical measuring instrument from first and second resiliently yieldable cantilever-type springs mounted on a support and spaced from the opposite ends of the coil assembly, the coil assembly being disposed between abutments located on the support between the springs and the ends of the coil assembly and having first and second thin elongated suspension filaments extending from opposite ends thereof, the steps comprising, placing the support in a position in which the first spring is disposed above the second spring and the coil assembly, placing a shim between the upper end of the coil assembly and the adjacent abutment to maintain the upper end of the coil assembly in spaced relationship from the abutment, hanging an object of a first predetermined weight equal to or greater than the weight of the coil assembly from the first spring to deflect the latter downwardly toward the coil assembly, fixing a portion of the first filament to the deflected first spring, removing the object from the first spring, placing the support in a position with the second spring disposed above the first spring and the coil assembly, hanging an object of a second predetermined weight of a magnitude between substantially the first predetermined weight and substantially the first predetermined weight minus the weight of the coil assembly from the second spring to deflect the latter downwardly toward the coil assembly, fixing a portion of the second filament to the deflected second spring, and removing the second object and the shim, whereby the springs exert a predetermined tensional force on the filaments and the coil assembly remains in the approximate position in which it was shimmed in spite of variations in the characteristics of the two springs.

9. The method defined in claim 8 in which the weight of the first object is equal to the weight of the second object.

10. The method defined in claim 8 in which the weight of one of the objects is greater than the weight of the other object to compensate for the weight of the coil assembly.

References Cited

UNITED STATES PATENTS

| | | | |
|---|---|---|---|
| 3,090,007 | 5/1963 | Palmer | 324—154 |
| 3,111,623 | 11/1963 | Thomander | 324—154 |
| 3,277,370 | 10/1966 | Clark | 324—154 |

JOHN F. CAMPBELL, Primary Examiner

C. E. HALL, Assistant Examiner

U.S. Cl. X.R.

140—89; 324—154